United States Patent [19]
Lush

[11] Patent Number: 6,047,661
[45] Date of Patent: Apr. 11, 2000

[54] COLLAPSIBLE WILD GAME FEEDER APPARATUS

[76] Inventor: Raymon W Lush, P.O. Box 126, Bloomfield, Nebr. 68718

[21] Appl. No.: 09/033,056

[22] Filed: Mar. 2, 1998

[51] Int. Cl.[7] ..................................................... A01K 5/00
[52] U.S. Cl. ........................................ 119/51.01; 119/52.3
[58] Field of Search .............................. 119/51.01, 52.2, 119/52.3, 57.8, 57.9, 434; 43/7, 9.1

[56] References Cited

U.S. PATENT DOCUMENTS

| | | |
|---|---|---|
| 3,399,650 | 9/1968 | Goodman . |
| 4,026,244 | 5/1977 | Salick . |
| 4,434,745 | 3/1984 | Perkins et al. . |
| 4,706,851 | 11/1987 | Hegedus ................................. 119/52.2 |
| 5,203,281 | 4/1993 | Harwich ................................. 119/57.9 |
| 5,299,530 | 4/1994 | Mukadam et al. ...................... 119/223 |
| 5,479,881 | 1/1996 | Lush ....................................... 119/578 |
| 5,755,176 | 5/1998 | Edwards ............................... 119/51.01 |
| 5,758,596 | 6/1998 | Loiselle ................................. 119/52.2 |
| 5,826,539 | 10/1998 | Bloedorn ............................... 119/52.2 |

FOREIGN PATENT DOCUMENTS 2222928  3/1990  United Kingdom .

*Primary Examiner*—Peter M. Poon
*Assistant Examiner*—Yvonne R. Abbott
*Attorney, Agent, or Firm*—Zarley, McKee, Thomte, Voorhees & Sease; Dennis L. Thomte

[57] ABSTRACT

A reversibly collapsible wild game feeder for containing and making available feed for the feeding of wild game including birds, squirrels or the like. The feeder has a generally cylindrical, durable bag having top and bottom ends. The bag is comprised of flexible, durable mesh that allows birds, squirrels or the like to perch and feed anywhere on the exterior of the bag without damaging the mesh. The feeder is self standing when placed on the bottom end and may be hung from a horizontal support. The empty feeder collapses to a fraction of its full height for storage and shipment.

1 Claim, 4 Drawing Sheets

COLLAPSIBLE WILD GAME FEEDER APPARATUS

BACKGROUND OF THE INVENTION

The present invention is directed generally to a new type of reversibly collapsible wild game feeder apparatus that is convenient to install, convenient for wild game to perch on, and resistant to damage from squirrels and other aggressively feeding wildlife.

THE PRIOR ART

Reversibly collapsible containers are commonly used to hold seeds, suet and the like as feed for wild game. Many reversibly collapsible wild game feeders of the known art are constructed from plastic polymer or natural fiber mesh or netting. Mesh or netting feeders have the advantage of not requiring a rod, dowel or other support for small birds that can perch on the mesh or net and feed at any exposed location on the feeder. Examples of mesh or net feeders of the prior art include the Thistle Pouch brand feeder manufactured by Havegard Farm, Inc. of Algoma, Wis. and Feathered Friends E-Z Feeders brand wild bird feeder marketed by Canine's Choice of Marion, Ind. Other examples of collapsible bags or sock-like wild game feeders are described in U.S. Pat. No. 4,706,851 to Hegedus, U.K. Patent No. 2,222,928 to Burns, and U.S. Pat. No. 4,026,244 to Salick. Another type of collapsible wild game feeder is described in U.S. Pat. No. 5,479,881 to Lush. The feeder of Lush consists of a solid, weather-resistant bag fitted with openings at its base to allow attachment of rods for perching and access to the seed or other food contained in the bag.

Although many collapsible wild game feeders of the known art are convenient to install and highly attractive to wild game when they are first placed out of doors, none of the collapsible feeders of the known art are suitable for feeding of squirrels or other large, aggressively feeding wildlife such as jays and monk parakeets. Squirrels and other large aggressively feeding wildlife quickly tear the mesh of collapsible feeders of the known art and create holes through which the food spills from the feeder onto the ground below. Similarly, squirrels and large birds can easily enlarge the feeding openings or simply create new openings in the walls of the feeder of Lush. After squirrels or large birds have damaged the net, webbing or walls of feeders of the known art the food spills out and is no longer available to attract wildlife to the feeder. This spilled feed creates additional problems by attracting mice and other pests that feed on the ground.

Wire mesh feeders constructed of rigid steel wire are also well known to those skilled in the art of wild game feeding. These wire mesh feeders are frequently used to hold blocks of suet or mixtures of seed, animal fat, peanut butter and the like. Although rigid wire mesh feeders of the known art are resistant to chewing by squirrels and pecking by aggressively feeding birds, these prior art devices are not reversibly collapsible. When they are bent, dented, flattened or crushed, wire mesh wild game feeders of the known art cannot be expanded and reused without suffering metal fatigue and damage to their attachments, connections and welds.

OBJECTS OF THE INVENTION

Accordingly, several objects and advantages of my invention are to provide a reversibly collapsible feeder for wild game that is inexpensive and simple to construct, easy to install and use, capable of accepting a wide variety of wildlife foods, and suitable for feeding of both small perching birds and also squirrels, jays and other more aggressively feeding wildlife species. Another object of my invention is to provide a reversibly collapsible feeder for wild game that requires a minimum of space for shipping and storage when empty. Further objects and advantages of my invention will become apparent from a consideration of the ensuing description.

SUMMARY OF THE INVENTION

A reversibly collapsible wild game feeder for containing and making available feed for the feeding of wild game including birds, squirrels or the like. The feeder has a generally cylindrical collapsible bag having means for closure on the bottom end.

BRIEF DESCRIPTION OF THE PREFERRED EMBODIMENTS

DESCRIPTION OF THE PREFERRED EMBODIMENTS

Figure 1:
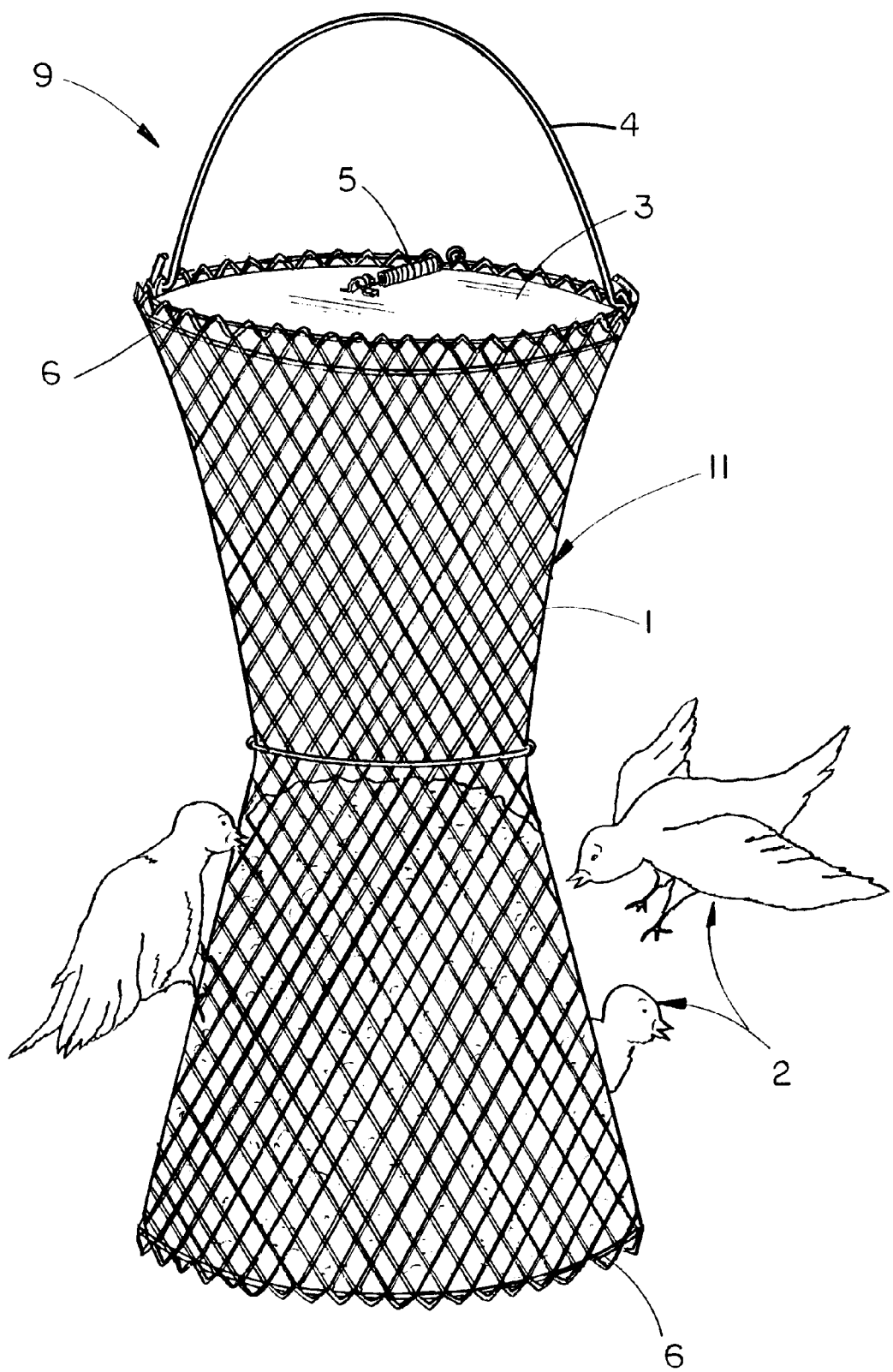
FIG. 1 is a side view of a preferred embodiment of the feeder apparatus in a first feeding configuration.
Figure 2:
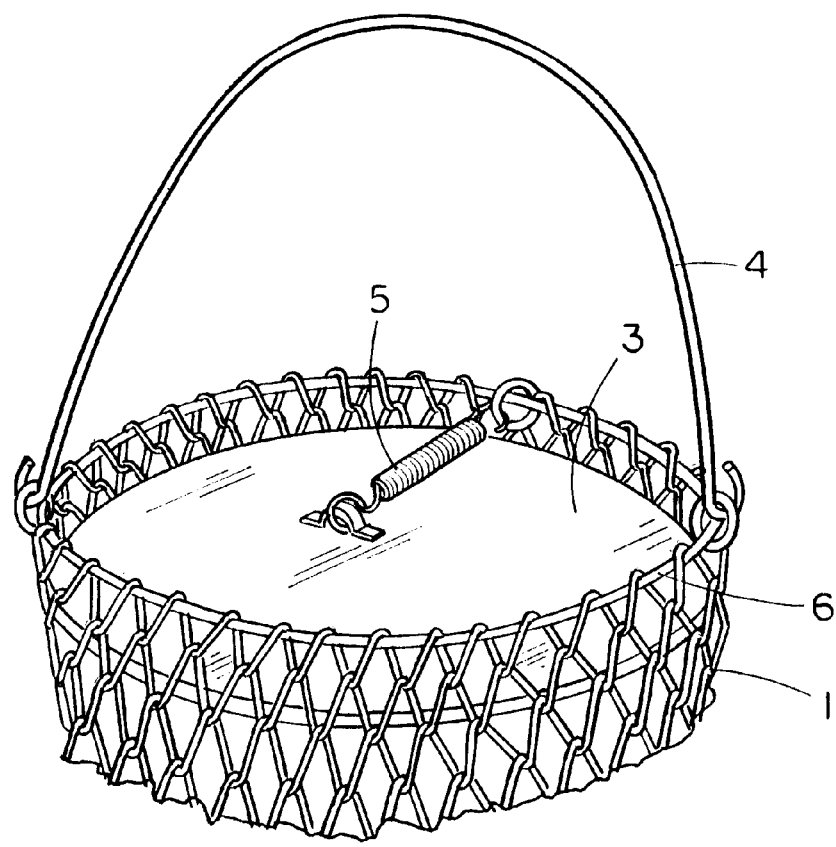
FIG. 2 is a perspective view of the top of the feeder apparatus of FIG. 1.
Figure 3:
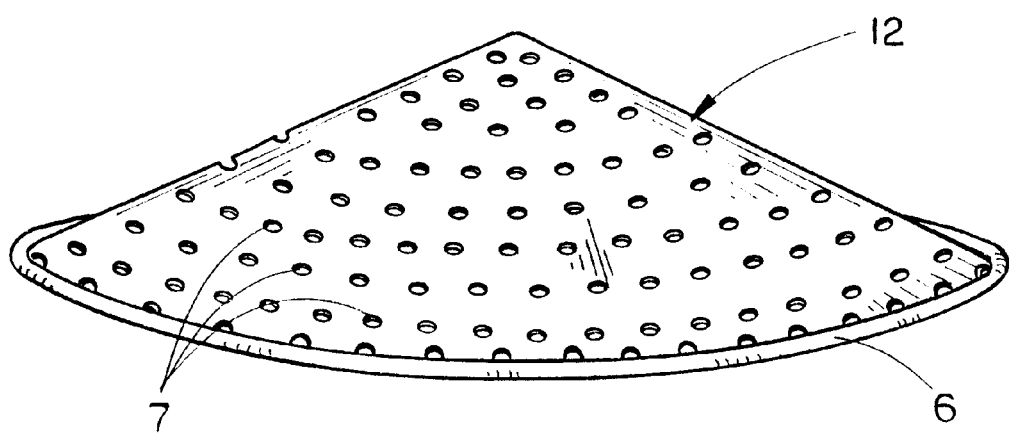
FIG. 3 is a side view of the base plate of the apparatus of FIG. 1.
Figure 4:
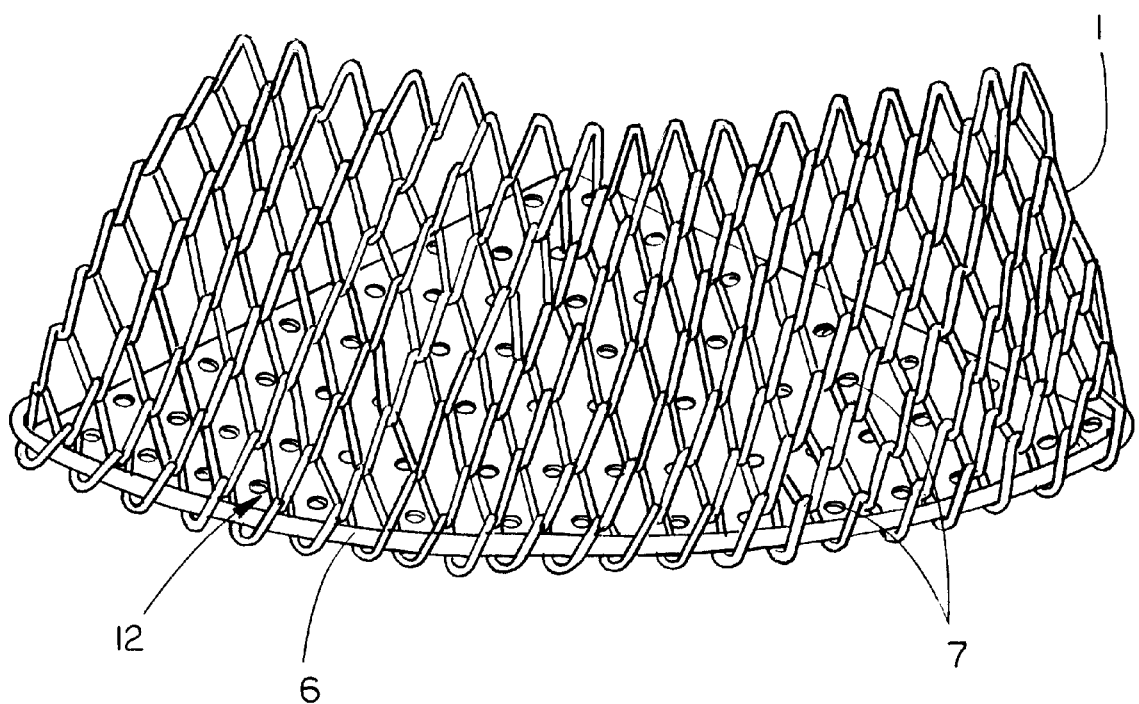
FIG. 4 is a side view of the bottom of the apparatus of FIG. 1 before feed is placed in the device.
Figure 5:
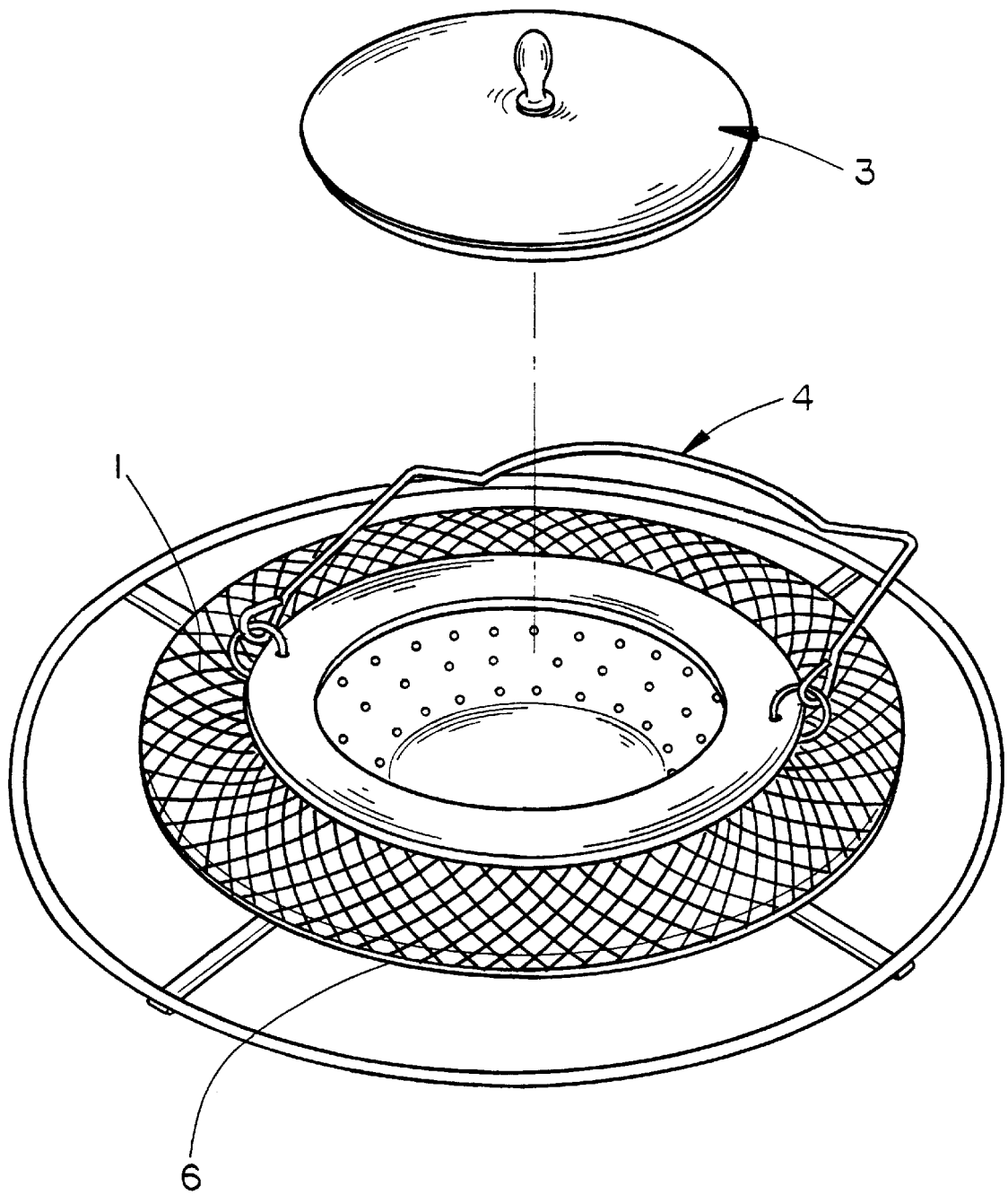
FIG. 5 is a perspective view of the feeder apparatus of FIG. 1 in a fully collapsed configuration.

The feeder apparatus 9 in one of its working environments is illustrated in FIG. 1. The major components of the apparatus will be seen to be the bag 11, the wild game species 2, the wild game feed 8, the reversibly collapsible mesh 1, the closure 3, the wire rings 6, the closure 5, the base plate 7 equipped with holes 12, and the support means 4 which may be a string, wire, or other similar support. FIG. 2 illustrates one way in which a resealable weatherproof closure may be attached to the bag 11 by means of a wire ring. FIG. 3 illustrates one way in which the bottom of the bag may be fitted with a base containing holes of a size suitable for draining water while retaining the wild game feed. FIG. 4 illustrates one way in which the bottom of the bag may be attached to the base plate. FIG. 5 illustrated how the apparatus in FIG. 1 can be collapsed for ease of storage between periods of use.

The composition of the reversibly collapsible mesh 1 is essential to operation of the wild game feeder apparatus of the present invention. Those skilled in the art will appreciate that the mesh of the bag 11 must be made of steel or other material of sufficient hardness to resist damage by squirrels, jays, monk parakeets and other aggressively feeding wild game species. Furthermore, those skilled in the art will understand that the links or junctions between the mesh elements 1 must be flexible and must allow the mesh elements to pivot on each other in the manner of mesh elements that are well known in collapsible wire mesh fish traps, wire mesh nets and the like. Those skilled in the art will recognize that the mesh of devices of the present invention may be made from materials suitable for use in collapsible metallic wire mesh fish traps and by processes suitable for manufacture of metallic wire mesh fish traps.

Those skilled in the art of wild game feeding will appreciate that the bag 11 of devices of the present invention may also be comprised in part of horizontally arranged rings of steel or other material of sufficient hardness to resist damage by squirrels, jays and the like. Wild game feeding devices of the present invention should be capable of reversibly collapsing in a vertical dimension to approximately 2 percent to 98 percent of their original height. An ability to reversibly collapse to between 5 percent and 95 percent of their original height is preferred.

The collapsible nature of the wild game feeder apparatus of the present invention allows devices such as that in FIG. 1 to hang from a horizontal support by means of the support means 4 or to stand unsupported on a horizontal surface as illustrated in FIG. 5.

Those skilled in the art of wild game feeding will appreciate that reversibly collapsible wild game feeding devices of the present invention may be constructed of a wide variety of materials in a wide variety of sizes and shapes and with a wide variety of supporting and closing means. It will also be apparent to those skilled in the art that the size of the openings 12 in the base plate and the size of the openings in the wire mesh bag 1 will vary with the size of the seed or other food to be presented. Those skilled in the art will appreciate that spherical seeds are inherently inappropriate for use in devices of the present invention unless they have been affixed to each other or are embedded in peanut butter, suet or the like.

Therefore, it is to be understood that the above description is intended in no way to limit the scope of protection of the claims and is representative of only one of many possible embodiments of the present invention.

Thus, there has been shown and described an invention which accomplishes at least all of the stated objectives.

I claim:

1. A collapsible feeder for birds, squirrels and the like, comprising:

a ring-shaped support defining a central feed fill opening;

a cover member selectively positioned on said support for selectively closing said central feed fill opening;

a collapsible metal mesh wall, having upper and lower ends;

said upper end of said collapsible metal mesh wall being secured to said support and extending downwardly therefrom;

and a perforated lower base secured to said collapsible metal mesh wall which extends across the lower end thereof;

said metal mesh wall comprising a plurality of horizontally disposed and sustantially vertically spaced wire members, each of said wire members having alternating ridges and grooves formed therein which intermesh with the grooves and ridges, respectively, of an adjacent wire member to permit said mesh wall to collapse;

said wire members defining generally diamond-shaped openings therebetween which are large enough to permit birds, squirrels and the like to feed therethrough, but which are small enough to prevent birds, squirrels and the like from entering the interior of the feeder.

\* \* \* \* \*